No. 710,622. Patented Oct. 7, 1902.
E. M. SINGLETON.
EYEGLASSES.
(Application filed Jan. 10, 1901.)
(No Model.)
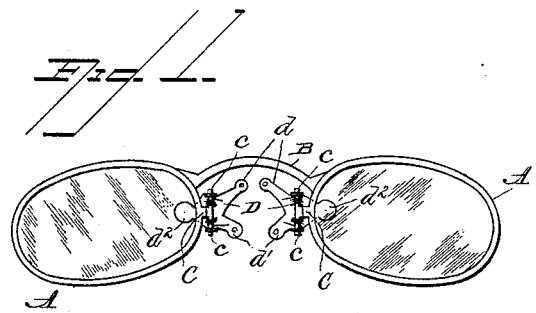
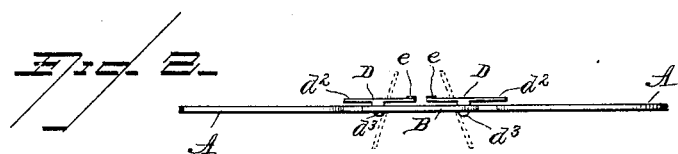
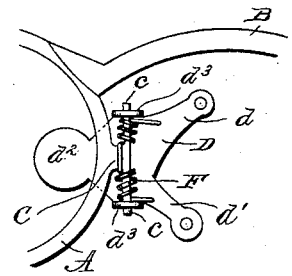
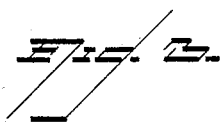

UNITED STATES PATENT OFFICE.

EUSTACE M. SINGLETON, OF MARSHALLTOWN, IOWA.

EYEGLASSES.

SPECIFICATION forming part of Letters Patent No. 710,622, dated October 7, 1902.

Application filed January 10, 1901. Serial No. 42,756. (No model.)

*To all whom it may concern:*

Be it known that I, EUSTACE M. SINGLETON, a citizen of the United States, and a resident of Marshalltown, in the county of Marshall and State of Iowa, have invented certain new and useful Improvements in Eyeglasses, of which the following is a specification.

The primary object of this invention is the production of improved nose-guards for eyeglasses which provide for certain adjustments, so that they can be properly fitted to the nose and will each present two points of contact.

A further object of the invention is to construct the nose guards or plates and hinge them in such manner that normally they will be disposed on a line with the glasses and their frames, permitting the eyeglasses to be placed in a flat case; and, furthermore, the invention provides nose-guards which can be easily and conveniently manipulated in placing the eyeglasses upon the nose.

With the above objects in view the invention consists in forming the nose-guard of a plate having arms forming the points of contact, a rearwardly-projecting arm or thumbpiece by which the nose-guards are manipulated, and ears at the upper and lower edges of the plate, combined with the frame having a lug with vertical pintles and a spring, the end portions of which are coiled upon the pintles and the terminals extended to bear upon the forward part of the plate or noseguard and give the required pressure.

The invention further consists in the particular construction and combination of the parts, all as will be hereinafter fully described, and more specifically set forth in the appended claims.

In the accompanying drawings, which form a part of this specification, and in which like letters of reference indicate like parts throughout the several views, Figure 1 is a front view of a pair of eyeglasses, showing the application of my invention thereto. Fig. 2 is an edge view of the nose-guards, dotted lines showing the position they assume when the eyeglasses are in position upon the nose. Fig. 3 is an enlarged detail view of one of the nose-guards.

Referring to said drawings, A A designate the eyeglass-frames, which are connected by a rigid bridge-piece B in the usual manner. In carrying out my invention each eyeglassframe is provided with a lug C, soldered to the inner end thereof below the bridge-piece, and provided with vertical pintles $c$ $c$, to which the nose-guards are hinged in the manner hereinafter set forth.

D D designate the nose-guards, each being made up of a plate of sheet metal shaped to present the forwardly-projecting arms $d$ and $d'$ and rearwardly-projecting arm or thumbpiece $d^2$, while the upper and lower ends of the body portion of the plate are formed with ears $d^3$ $d^3$, bent outwardly, as shown, and apertured to receive the pintles $c$ $c$. The arms $d$ and $d'$, which form the contact-points of the nose-guards, are provided at their outer ends with pads $e$, forming the bearing-surfaces, and these pads are made of aluminium, so that they will not rust or tarnish and can be easily kept clean.

F designates a spring which bears against the forward part of the plate to bring the arms or contact-points thereof in engagement with the nose when the eyeglasses are in use. The said spring consists of a length of wire the end portions of which are coiled around the pintles $c$ $c$, while the terminals are brought forward to bear upon the plate or nose-guard. This wire is coiled upon the pintles before the plates forming the nose-guards are applied to said pintles, and in applying the plates an ear is placed over one of the pintles and the coiled portion of the spring thereon is compressed sufficiently to permit the other ear to be placed upon the opposite pintle, the expansion of the two coils retaining the plate upon the pintles, while the torsion of the spring gives the pressure required to hold the eyeglasses on the nose of the wearer. This particular manner of attaching the plates or nose-guards to the pintles provides that they may be readily removed for the purpose of cleaning them.

In placing the eyeglasses upon the nose the thumb-pieces of the nose-guards are grasped by the index-finger and thumb of one hand, and by pressing them together the forward part of the nose-guards are separated or opened, so that they may be placed over the nose and move into contact therewith when the pressure is released. When applied, the thumb-pieces or projections $d^2$ project forwardly and are in position to be readily grasped in removing the eyeglasses. It will be noted, therefore, that the eyeglasses may be placed upon the nose and removed therefrom with the greatest facility and without requiring the use of both hands to adjust or remove them.

The arms $d$ and $d'$, which form the contact-points of the nose-guards, can be easily bent forward or backward independently to properly adjust them to the contour of the nose, and as each nose-guard presents two points of contact the eyeglasses will be securely held in place without undue pressure.

An important advantage in forming the nose-guards of plates and hinging them to the eyeglass-frames, as herein shown and described, is that when at rest or in their normal position the said plates fold or swing back on a plane with the eyeglasses and leave no projecting parts that will interfere in any way with their being inserted in a case, permitting a flat compact case to be used.

Having thus described my invention, I do not wish to be limited to what is herein precisely shown and described, for it is obvious that immaterial changes could be made in the shape of the arms and thumb-pieces without sacrificing any of the advantages of my invention. I therefore desire to reserve the right to change or modify the parts of the invention within the spirit and scope of my claims.

I claim—

1. A nose-guard for eyeglasses, comprising a plate shaped to present contact-arms at one end and a thumb-piece at its other end, these parts lying in substantially the same plane, the intermediate portion of said plate having ears projecting laterally therefrom; combined with the eyeglass-frame having pintles with which the ears of the nose-guard engage, and a spring bearing against the nose-guard, whereby the said nose-guard will normally lie on a plane parallel with the eyeglass-frame, as herein shown and described.

2. A nose-guard for eyeglasses, comprising a plate presenting projecting arms and a rearwardly-projecting thumb-piece, ears projecting from the upper and lower ends of the plate; combined with a frame having a lug with vertical pintles projecting from opposite sides thereof, and a wire spring the end portions of which are coiled upon the pintles and the terminals extended outward, to bear against the nose-guard, substantially as shown and for the purpose set forth.

3. In eyeglasses, the combination of the eyeglass-frames united by a bridge-piece and having vertical pintles, a wire spring having its end portions coiled around the pintles and its terminals extended outward to bear against the nose-guard; together with the nose-guards each made up of a flat plate shaped to present arms forming the contact-points and a rearwardly-projecting arm forming a thumb-piece, the said plate being also provided with upper and lower projections pierced and bent to form ears by which the plate is hinged to the pintles, substantially as herein shown and described.

EUSTACE M. SINGLETON.

In presence of—
G. A. MOTE,
JAMES ALLISON.